(No Model.) 4 Sheets—Sheet 2.

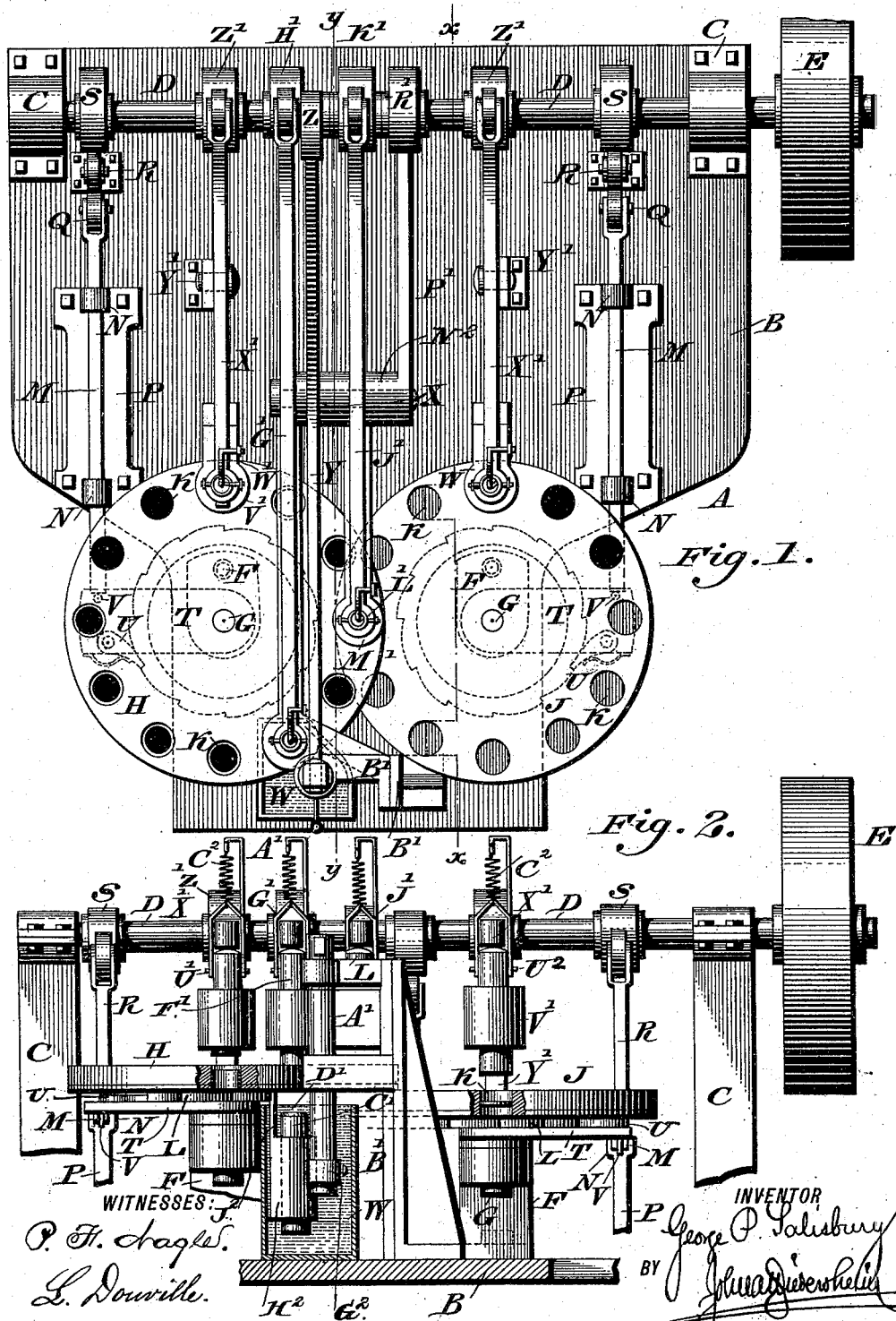

G. P. SALISBURY.
MACHINE FOR MAKING PAPER BOXES.

No. 470,414. Patented Mar. 8, 1892.

WITNESSES:
P. H. Eagles
L. Douville

INVENTOR
George P. Salisbury
by John A. Wiedersheim
ATTORNEY.

(No Model.) 4 Sheets—Sheet 3.

G. P. SALISBURY.
MACHINE FOR MAKING PAPER BOXES.

No. 470,414. Patented Mar. 8, 1892.

WITNESSES:
P. F. Chapple
L. Douville

INVENTOR
George P. Salisbury
BY
ATTORNEY.

(No Model.) 4 Sheets—Sheet 4.
G. P. SALISBURY.
MACHINE FOR MAKING PAPER BOXES.

No. 470,414. Patented Mar. 8, 1892.

WITNESSES:
L. Douville,
P. H. Chagle.

INVENTOR
George P. Salisbury
BY
John A. Diedersheim
ATTORNEY.

UNITED STATES PATENT OFFICE.

GEORGE P. SALISBURY, OF PHILADELPHIA, PENNSYLVANIA, ASSIGNOR TO EUGENE K. PLUMLY, OF SAME PLACE.

MACHINE FOR MAKING PAPER BOXES.

SPECIFICATION forming part of Letters Patent No. 470,414, dated March 8, 1892.

Application filed March 13, 1890. Serial No. 343,731. (No model.)

*To all whom it may concern:*

Be it known that I, GEORGE P. SALISBURY, a citizen of the United States, residing in the city and county of Philadelphia, State of Pennsylvania, have invented a new and useful Improvement in Machines for Making Paper Boxes, which improvement is fully set forth in the following specification and accompanying drawings.

My invention relates to improvements in machines for making paper boxes; and it consists, first, of the combination of two rotary tables having separate shafts and overlapping edges with registering pockets therein, a pasting-brush adapted to enter from the under side the pockets successively of one of said tables, and a plunger adapted to enter at the same time from the upper side the same pocket as the brush.

It further consists of the combination of two tables having separate shafts and overlapping adjacent edges, the latter with registering-pockets therein, and upper and lower plungers adapted to enter the registering-pockets of the said tables.

It further consists of the combination of parts hereinafter set forth and claimed.

Figure 3:
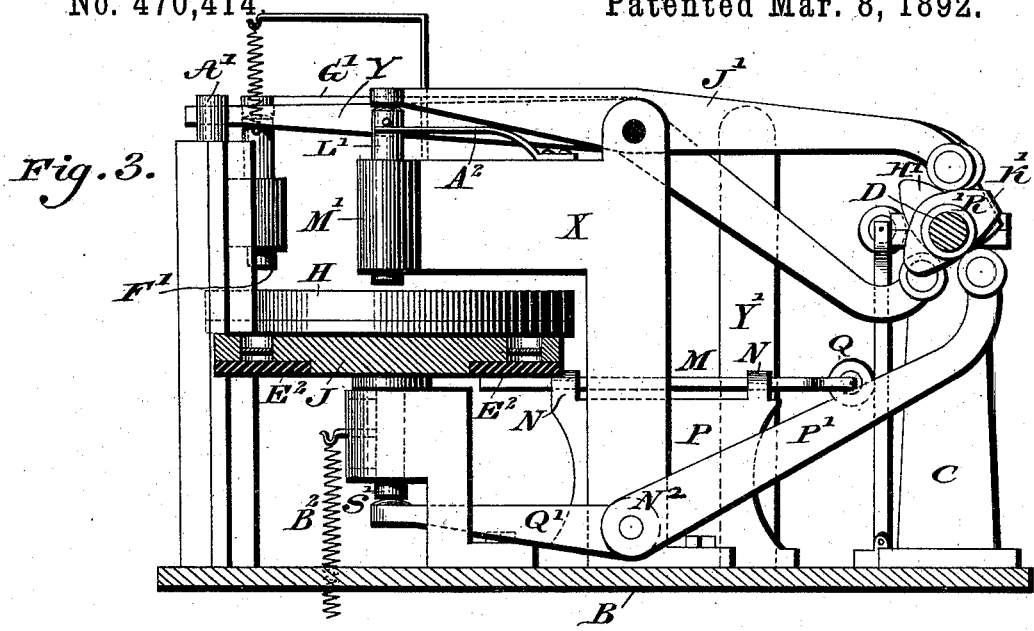
Figure 4:
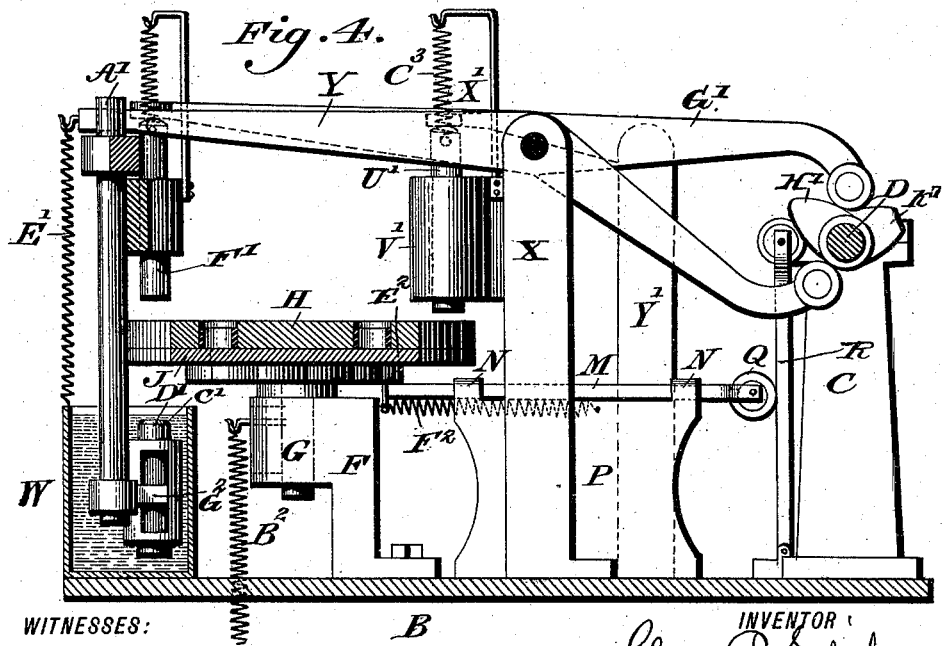
Figure 5:
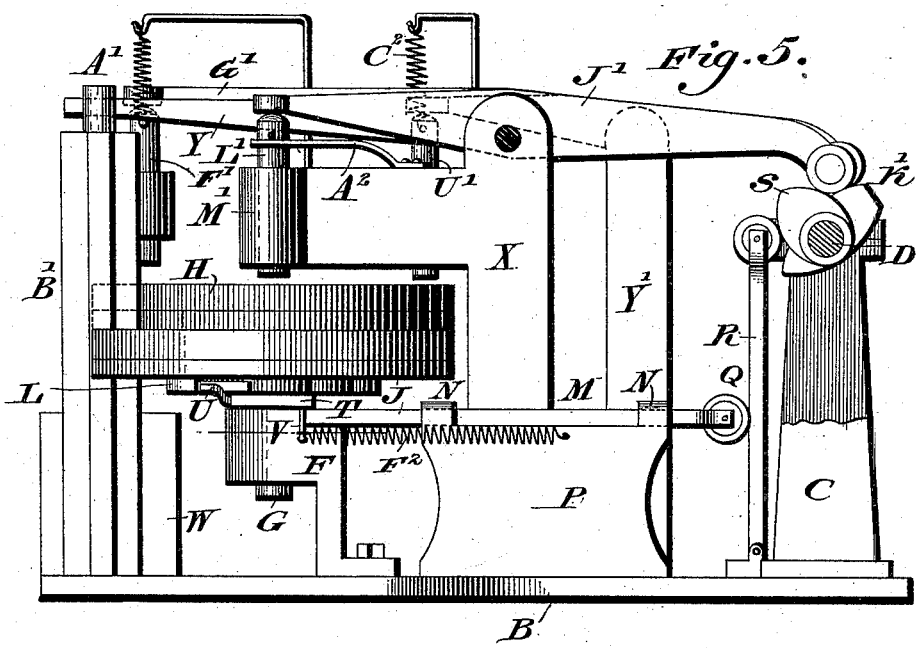
Figure 6:
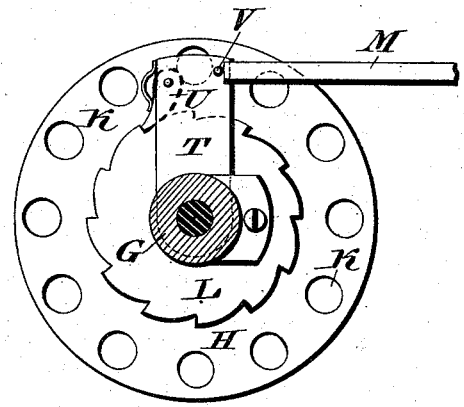
Figure 7:
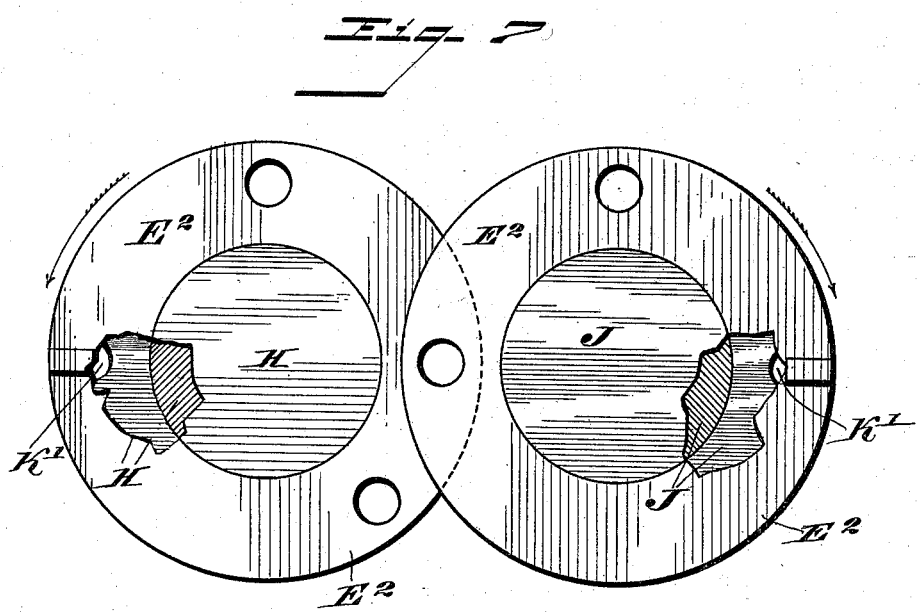
Figure 8:
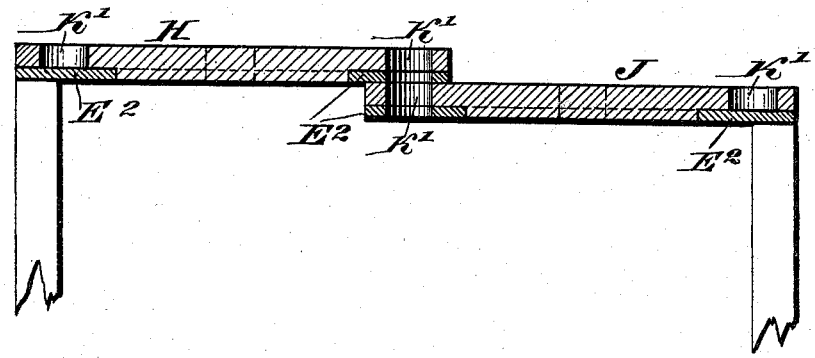

Figure 1 represents a plan view of a machine embodying my invention. Fig. 2 represents an end view of the device shown in Fig. 1, the walls of the paste pot or vessel being broken away to show the pasting device. Fig. 3 represents a vertical section on line $x$ $x$, Fig. 1. Fig. 4 represents a vertical section on line $y$ $y$, Fig. 1. Fig. 5 represents a side view of the device shown in Fig. 1, the pulley and housing for the shaft being omitted. Fig. 6 represents a bottom view of one of the rotatable tables, showing a portion of the mechanism for operating the same. Fig. 7 represents a bottom plan view of the supporting-rings of the rotary tables, partly broken away; and Fig. 8 represents a central vertical section of the rings and tables with supports.

Similar letters of reference indicate corresponding parts in the several figures.

Referring to the drawings, A designates a machine for pasting or securing together the disks and sides of the lid and body of a pill or other box. To a suitable base B thereof are secured the standards C C, in which is journaled a driving-shaft D, operated by the pulley E, the latter receiving power from any suitable motor. In the standards F F, firmly secured to the base B, are the shafts G G of the horizontal tables H J. One of the said tables has one of its sides overlapping the adjacent side of the other table, and each of the said tables is provided with the openings or pockets K near the rims thereof and adapted to hold either the sides or the disks of the body and lid of a pill or other box, and each table has on its under side and connected with the shaft thereof a ratchet-wheel L, the said shaft being adapted to rotate with the said table and ratchet-wheel. The sliding rods M, having the guides N on a raised portion or attachment P of the base and each provided with a roller Q at one end thereof adapted to bear against a pivoted lever R, operated by the rotation of the cam S on the driving-shaft D, and an arm T, pivoted on the shaft G and carrying a spring-pressed pawl U, engaging the teeth of the ratchet-wheel L, rotate the said tables.

The rods M engage studs V on the arms T in order to move the said arms so as to operate the pawls, and the springs $F^2$ return the said arms to their normal position after the pawl has moved the ratchet-wheel the distance of a tooth. The tables H J are so located relatively to each other that the pockets K of each successively register or coincide as the tables rotate. At one end of the base B and adjacent to the tables H J is located a vessel or receptacle W, adapted to contain paste or other adhesive substance for securing the sides and disks of a box together.

In a standard X is pivoted a lever Y, having one of its ends provided with a roller, which latter is in contact with a cam Z on the driving-shaft D, its other end engaging with a rod A', which is vertically guided on a standard B', secured to the base, and carries a brush C', which is in the vessel W. The brush C' has a beveled top, as at D', permitting the paste to readily leave the same as it is raised from the receptacle W, so that the brush will slightly paste the lower ends of the sides of the box. A spring E', connected with the rod A', serves to lower it and the brush C', so that the latter can again be ready for pasting the lower ends of the sides of another box. To hold the sides of the box in place in the pocket while being pasted, a clamping-plunger F', operated by a lever G', which is pivoted on the standard X and actuated by a cam H' on the driving-shaft, is employed.

Pivotally mounted in the standard X is a lever J', having one of its ends provided with a roller, which is in contact with a cam K' on the driving-shaft, the other end being adapted to be in contact with the upper rounded end of an upper plunger L', working in a tubular portion M' of the standard X and adapted to enter the pockets K of the upper table of the said tables H J when they coincide or register during the rotations of the said tables.

Pivotally secured to the lower portion of the standard X is an oscillating sleeve $N^2$, having arms P' Q', rigidly attached thereto. The arm P' has on its outer end a roller, which bears against a cam R' on the driving-shaft D, and the arm Q' bears at its outer end against a lower plunger S', which enters from the under side the pockets of the table when they coincide during the rotation of the said tables. A spring $B^2$ lowers the plunger S' when its upward movement has been completed.

Underneath a recessed portion on the under side of the rim of each of the tables H and J and beneath the pockets K and secured to suitable supports on the base B are stationary circular plates or rings $E^2$, having openings therein which coincide with the openings or pockets K, which are receiving the pasting-brush, the clamping-plunger F', the upper and lower pressing-plungers, and the removal-plunger, so that the sides and disks of the box are reliably held in the pockets during the rotation of the tables until they are operated on by said brush and plungers.

To remove the body or lid of a box from the pocket, the plunger U' is employed. The said plunger moves in tubular portions V' of the standard W', which is secured to the base, and is depressed or lowered by the movement of levers X', pivotally mounted in the standards Y', also secured to the base. Rigidly mounted on the driving-shaft D are the cams Z', the rotation of which operates the said lever X'. A plunger $U^2$ clears the pockets J of any adhering paste.

The operation of the device is as follows: The parts being in position, as shown in Fig. 1, when it is desired to operate the machine power is applied to the driving-pulley E and shaft D, causing the rotation of the latter, and thereby the cams S thereon. The movement of said cams S, bearing against the rollers on the levers R, forces the said levers against the roller ends of the sliding rods M, so that the latter are pushed against the studs V of the arms T, thus moving said arms and their pawls U, which engage the teeth of the ratchet-wheels L, thereby rotating the same and the tables connected therewith a distance of one tooth or a pocket. The sides of a box are fed to the pockets of one of the tables and the disks are fed to the pockets of the other table.

The wheels H and J are similar in construction, so that they may be interchanged, if desired.

During the advance of each of the tables in their rotation the operating-lever Y of the pasting mechanism, actuated by the movement of the cam Z on the driving-shaft, raises its brush C', so that it, with the paste thereon, enters from below the pocket K of the table H, containing the sides of a box, so that the paste is brought in contact with the lower ends of the sides of the box, the said sides being held in place by the plunger F', which enters the pocket K, being operated by the movement of the lever G', the latter being actuated by the contact therewith of the cam H' of the driving-shaft. As a pocket of the table H containing the sides of a box having its lower ends pasted registers with a pocket of the table J containing a disk, the rotation of the driving-shaft causes the cam K' to move the lever J', so that the plunger L' enters the registering pocket of the table H and the sides of a box therein, while at the same time the plunger S' rises and enters the registering pocket of the table J, forcing the disk therein upward and into the pocket of the table H and against the pasted lower ends of the sides of the box, the lower end of the plunger L' providing a support for the opposite side of the disk while being pressed or secured to the said sides. The plungers S' and L', respectively, are removed from the pockets after performing their work by means of the springs $A^2$ and $B^2$, which are secured to the said plunger and to the base and standards of the device. As the tables are further rotated, so that the pocket K, containing the completed lid or body, is in line with one of the plungers U', the latter, actuated by the lever X', enters the said pocket and pushes out the contents thereof, so that the pocket is in condition for a fresh supply of material. Only one of the plungers U' is necessarily operative at the one time in removing the completed articles, as the same are in but one of the tables. The said plungers U' are raised from the pockets by means of the springs $C^2$, so as to be in place to be actuated by the movement of their levers X'. To return the sliding arms M after the pawls U have moved the ratchet-wheels L so that they may be in place for the next movement of the levers R, the springs F, secured to the studs V, and the blocks or attachment P of the base are employed.

The pasting-brush $C^2$ is preferably secured to the vertically-moving rod A' by a yoke $G^2$, which when the brush rises and falls moves in a slot in the holder $H^2$, the latter having an arm $J^2$, by which it is secured to the plate or ring $E^2$ beneath the table H.

Having thus described my invention, what I claim as new, and desire to secure by Letters Patent, is—

1. The combination of two rotary tables having separate shafts and overlapping edges with registering pockets therein, a pasting-brush adapted to enter from the under side the pockets, successively, of one of said tables, and a plunger adapted to enter at the same time from the upper side the same pocket with the brush, substantially as described.

2. The combination of two rotary tables having separate shafts and overlapping adjacent edges with registering pockets therein, a pasting-brush adapted to enter, successively, the pockets of one of said tables, a plunger adapted to enter from the upper side the pockets of the said tables at the same time with the pasting-brush, upper and lower plungers adapted to enter simultaneously the registering pockets of the said tables, and a plunger adapted to enter the pockets of one of the tables for removing the completed article, substantially as described.

3. The combination of two rotary tables having separate shafts and overlapping adjacent edges with registering pockets therein, a pasting-brush adapted to enter the pockets of one of said tables from below, an upper plunger adapted to enter the upper registering pocket, and a lower plunger adapted to enter the lower registering pocket and raise the disk in the lower pocket into the upper registering pocket, substantially as described.

4. The combination of two rotary tables having separate shafts and overlapping adjacent sides, the latter with registering pockets therein, and upper and lower plungers adapted to enter the registering pockets of the said tables, substantially as and for the purpose set forth.

5. The combination of two rotary tables having separate shafts and overlapping adjacent sides, the latter with registering pockets therein, stationary plates forming bottoms for some of said pockets and having openings coinciding with the other pockets in said tables, a pasting device with brush adapted to enter successively each of the pockets of one of the said tables, and upper and lower plungers adapted to enter the registering pockets of said tables, substantially as and for the purpose set forth.

6. The combination of two rotary tables having separate shafts and overlapping adjacent edges, the latter with registering pockets therein, stationary plates forming bottoms for some of said pockets and having openings coinciding with the other pockets in said tables, a pasting device with brush adapted to enter the pockets successively of one of said tables, an upper and a lower plunger adapted to enter the registering pockets of said tables, and a removing-plunger adapted to enter the pockets of one of the tables containing the completed article, substantially as described.

7. In a device for the purpose named, two rotary tables having separate shafts and overlapping edges, the latter having registering openings or pockets therein, an upper plunger with an actuating-lever, a driving-shaft with a cam thereon operating said lever, a lower plunger, an oscillating sleeve with an arm in contact with said lower plunger, and an arm engaged by a cam on the driving-shaft, said upper and lower plungers being adapted to enter said registering-pockets, said parts being combined substantially as described.

8. In a device for the purpose named, a rotary table with pockets therein, a stationary ring forming at times a bottom for said pockets and having openings coinciding at times with said pockets, a rising and falling brush entering said openings and pockets from below, and a holding device adapted to enter a pocket at the same time with the brush from above, said parts being combined substantially as described.

GEORGE P. SALISBURY.

Witnesses:
JOHN A. WIEDERSHEIM,
WM. C. WIEDERSHEIM.